(12) United States Patent
Mixer et al.

(10) Patent No.: US 10,250,624 B2
(45) Date of Patent: Apr. 2, 2019

(54) METHOD AND DEVICE FOR ROBUST DETECTION, ANALYTICS, AND FILTERING OF DATA/INFORMATION EXCHANGE WITH CONNECTED USER DEVICES IN A GATEWAY-CONNECTED USER-SPACE

(71) Applicant: TOTAL HOME INFORMATION SHIELD, LLC, Austin, TX (US)

(72) Inventors: Robert A. Mixer, Cedar Park, TX (US); Laurence E. Russell, Georgetown, TX (US)

(73) Assignee: Oak Tree Logic, LLC, Austin, TX (US)

( * ) Notice: Subject to any disclaimer, the term of this patent is extended or adjusted under 35 U.S.C. 154(b) by 52 days.

(21) Appl. No.: 15/229,439

(22) Filed: Aug. 5, 2016

(65) Prior Publication Data
US 2018/0041529 A1 Feb. 8, 2018

(51) Int. Cl.
*H04L 29/06* (2006.01)
*G06N 99/00* (2010.01)
*H04W 12/12* (2009.01)
*H04W 12/06* (2009.01)

(52) U.S. Cl.
CPC ...... *H04L 63/1425* (2013.01); *H04L 63/0245* (2013.01); *H04W 12/12* (2013.01); *H04L 63/0272* (2013.01); *H04L 63/145* (2013.01); *H04L 63/1466* (2013.01); *H04W 12/06* (2013.01)

(58) Field of Classification Search
CPC ............. H04L 63/1425; H04L 63/0245; H04L 63/1466; H04L 63/0272; H04L 63/145
See application file for complete search history.

(56) References Cited

U.S. PATENT DOCUMENTS

| | | | | |
|---|---|---|---|---|
| 2002/0010865 A1* | 1/2002 | Fulton | ................. | H04L 12/2856 726/5 |
| 2004/0066759 A1* | 4/2004 | Molteni | ................. | H04L 41/048 370/329 |
| 2004/0210653 A1* | 10/2004 | Kanoor | ..................... | G06F 8/65 709/223 |
| 2005/0054445 A1* | 3/2005 | Gatto | ..................... | G07F 17/32 463/42 |
| 2009/0207749 A1* | 8/2009 | Roskowski | ......... | H04L 41/0681 370/252 |

(Continued)

*Primary Examiner* — Catherine B Thiaw
*Assistant Examiner* — Arya Golriz
(74) *Attorney, Agent, or Firm* — Isidore PLLC

(57) ABSTRACT

A security appliance includes: a network port enabling direct connection to a gateway; a storage module having stored thereon firmware for operating the security appliance; and a processor that executes the program code of the firmware. The firmware configures the appliance to: establish a seamless communication interface with a connected gateway; monitor traffic coming into and going out from the connected gateway; and identify traffic anomalies within the monitored traffic. The firmware further configures the appliance to: in response to identifying one or more of the traffic anomalies: forward information about the identified traffic anomalies to a centralized database for evaluation and reporting; and initiate steps to prevent further occurrence of the traffic anomalies, without user approval.

20 Claims, 11 Drawing Sheets

(56) References Cited

U.S. PATENT DOCUMENTS

| | | | | |
|---|---|---|---|---|
| 2010/0188975 | A1* | 7/2010 | Raleigh | G06Q 10/06375 370/230.1 |
| 2011/0010543 | A1* | 1/2011 | Schmidt | H04W 12/10 713/168 |
| 2012/0071131 | A1* | 3/2012 | Zisapel | H04L 63/1408 455/410 |
| 2013/0212680 | A1* | 8/2013 | Winn | H04L 51/12 726/23 |
| 2013/0312074 | A1* | 11/2013 | Sarawat | H04W 12/06 726/7 |
| 2015/0109128 | A1* | 4/2015 | Fadell | G08B 27/003 340/540 |
| 2015/0341379 | A1* | 11/2015 | Lefebvre | H04L 63/1425 726/22 |
| 2016/0189531 | A1* | 6/2016 | Modi | G08B 29/185 340/506 |

* cited by examiner

| ENTERPRISE ID 505 | APPLIANCE ID 510 | TIMEFRAME 515 | MALWARE THREATS COUNTS |||||  BLACKLIST |
| | | | APPLIANCE - ALL 520 | POPULATION STATS 525 | ENTERPRISE STATS 530 | TOP PRIORITY 1 535 | GEO DISTRIBUTION 540 | TOP LOCATION 545 |
| --- | --- | --- | --- | --- | --- | --- | --- | --- |
| GDDSGHADIE | FAKHSS-AHSDFKKJA | Last 30d | 1145 | mean=300 median=390 std dev=110 | mean=280 median=290 std dev=70 | 1:1123224:1 (54) | USA=480 EUR=160 ASIA=419 S.AMER=44 AFRICA=29 | 88.123.65.43:23 (5) |
| GDDSGHADIE | FAKHSS-AHSDFKKJA | Last 7d | 639 | mean=350 median=370 std dev=99 | mean=289 median=290 std dev=76 | 1:1123224:1 (50) | USA=302 EUR=40 ASIA=260 S.AMER=22 AFRICA=15 | 88.123.65.43:23 (2) |

METHOD AND DEVICE FOR ROBUST DETECTION, ANALYTICS, AND FILTERING OF DATA/INFORMATION EXCHANGE WITH CONNECTED USER DEVICES IN A GATEWAY-CONNECTED USER-SPACE

BACKGROUND

1. Technical Field

The present disclosure generally relates to internet data security and in particular to data security for defined user spaces having devices that connect via a network portal/gateway to a larger public network.

2. Description of the Related Art

As the world continues to evolve technologically, an increasingly growing number of business people perform portions of their work from locations that are remote from their business offices/workplace. Employees and owners in different sizes of businesses, ranging from small businesses to large corporate organizations, often perform a significant portion of their work on internet-connected devices from their home. That work can involve and/or require collaboration with others, email exchanges, remotely accessing an enterprise/business network, synching with a business server or cloud-based storage, etc., all tasks that require the user have access to the internet. In a large number of these situations, the home based user has a gateway device (or gateway) installed within the home to provide the access of the user's mobile and home devices to the Internet, which is a public network. These home access points can provide connectivity for user computers, and other home based devices, such as phones, televisions, security systems, etc., to the public network.

Typically, some basic security protections for the local network can be provided at the gateway in the form of filtering communications initiated from the internet and obscuring discovery of the various connected mobile and home devices. However, these security protections do not filter the actual data that is coming in from the public network or the data that is being transmitted out from the home onto the public network. These gateways fail to protect the download of malware or the subsequent transmissions of malware, nor do they stay current on other rapidly evolving internet threats, leaving the home network and devices vulnerable. The user's device can be easily infected or hacked due to its unprotected access to the public network while at home.

Increasingly, enterprise businesses are being made vulnerable to attacks that can occur outside of the safety zone of the on-site, secured local area network that has a team of information technology (IT) personnel and/or embedded protections design to prevent external access to the data being shared within the network. While some larger enterprises provide their employees with a mechanism for creating a secure tunnel back to the enterprise network (e.g., through use of a secure virtual private network (VPN)), the majority of businesses do not have this feature available. And, even when deploying remote employees with these "secure" VPN connections, the company can still be at risk of infiltration because of the vulnerability (or lesser security) that exists at the end user connection to the network via the home gateway device. More importantly, with the employees remotely connecting in, from home using their at-home gateway, the vulnerability of the business to these attacks is an unknown quantity.

BRIEF SUMMARY

Disclosed are a security appliance, a system, and a method for enhancing security of a user local network having a gateway (i.e., a consumer network access device) by which a user client device accesses a connected public network. According to one aspect, the security appliance includes: a network port enabling direct connection to a gateway; and a storage module having stored thereon firmware for operating the security appliance. The security appliance also includes a processor that executes the program code of the firmware, which configures the appliance to: establish a seamless communication interface with a connected gateway; monitor traffic coming into and going out from the connected gateway; and identify traffic anomalies within the monitored traffic. The firmware further configures the appliance to, in response to identifying one or more of the traffic anomalies: forward information about the identified traffic anomalies to a centralized database for evaluation and reporting; block and filter out unwanted and undesirable traffic associated with the anomalies in both inbound and outbound communications, without requiring assistance of/from a centralized database for evaluation and response; and initiate steps to report on and prevent further occurrence of the traffic anomalies, by generating one or more alerts and updating a remote server database.

According to another aspect, the system includes the aforementioned security appliance as well as a server that is communicatively connected to the security appliance via the network. The server has a server processor that is communicatively coupled to a secured centralized database, and which executes server firmware that causes the server to: receive data from a plurality of different security appliances, each associated with a specific local user network to which a respective appliance is connected; analyze the received data for potential harm to one of the user device and an enterprise network to which the user device connects; and generate a report that consolidates a result of analyzing the data in a generalized report, including patterns of use and connection, of the device. The server firmware also causes the processor to forward the generated report to one or more interested parties subscribed to receive the report. The server firmware further causes the server processor to: enable automated sharing of real-time threat intelligence between different appliances; and provide an application programming interface for integrating aggregate data of multiple appliances into other applications and workflows to provide increased network security for remote client access to the enterprise network and/or to provide enterprises with visibility into the network security of their remote workforce. Additionally, the server firmware enables the server processor to also detect and/or analyze potential vulnerabilities in a gateway (independent of detecting and analyzing an already compromised router) in order to provide enhanced protection against possible attacks. Also, the server firmware enables the server to generate and forward configurable push alerts for security issues identified by the appliances.

According to yet another aspect, the method includes: interfacing, via a security appliance, with a local user network device that supports external/public network connectivity and information communication by one or more user devices; detecting traffic anomalies and anomalies within a behavior associated with Internet usage through machine learning algorithms; in response to identifying one or more of the traffic anomalies: forward information about the identified traffic anomalies to a centralized database for evaluation and reporting; and blocking out unwanted and undesirable traffic associated with the anomalies in both inbound and outbound communications. The method further includes: profiling communication across the network to automatically identify a network endpoint; dynamically tuning security controls based on the characterization of a device's communication profile; periodically updating a network-wide intrusion prevention policy via accessing generally available threat intelligence; performing reputation-based filtering of Internet communications based on that threat intelligence; performing security assessments of a configuration of the router; identifying and blocking man-in-the-middle attacks on the network; and detecting and analyzing characteristics associated with the router having been compromised.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates a data table presenting example list of data that can be tabulated by the security appliance during device discovery and tracking within a home network environment, in accordance with one embodiment;

DETAILED DESCRIPTION

Figure 1:
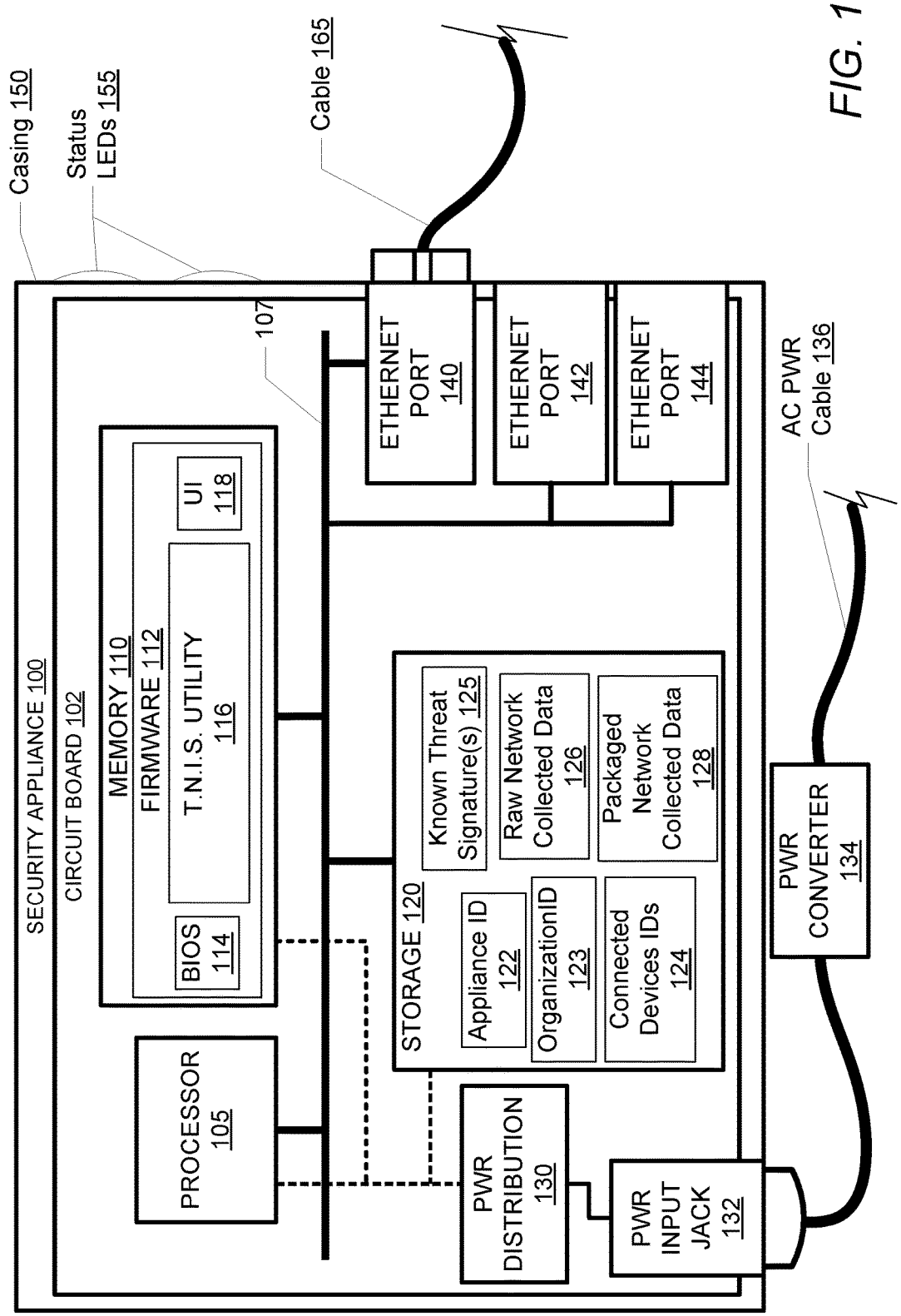
FIG. 1 is a block diagram illustration of an example security appliance configured with hardware and firmware to complete the various appliance-implemented processes described herein, according to one or more embodiments.

The illustrative embodiments provide a security appliance, a system, and a method Disclosed are a security appliance, a system, and a method for enhancing security of a user local network having a gateway (i.e., a consumer network access device) by which a user client device accesses a connected public network. According to one aspect, the security appliance includes: a network port enabling direct connection to a gateway; and a storage module having stored thereon firmware for operating the security appliance. The security appliance also includes a processor that executes the program code of the firmware, which configures the appliance to: establish a seamless communication interface with a connected gateway; monitor traffic coming into and going out from the connected gateway; and identify traffic anomalies within the monitored traffic. The firmware further configures the appliance to, in response to identifying one or more of the traffic anomalies: forward information about the identified traffic anomalies to a centralized database for evaluation and reporting; block and filter out unwanted and undesirable traffic associated with the anomalies in both inbound and outbound communications, without requiring assistance of/from a centralized database for evaluation and response; and initiate steps to report on and prevent further occurrence of the traffic anomalies, by generating one or more alerts and updating a remote server database.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures, and particularly FIGS. 1, 2 and 3 may vary. The illustrative components of these various figures are not intended to be exhaustive, but rather are representative to highlight some of the components that are utilized to implement certain of the described embodiments. For example, different configurations of an security appliance (100) may be provided, containing other devices/components, which may be used in addition to or in place of the hardware depicted, and may be differently configured. The depicted example is not meant to imply architectural or other limitations with respect to the presently described embodiments and/or the general invention.

Referring now to the figures and beginning with FIG. 1, which provides a block diagram illustration of an example security appliance 100, which provides the end-user side of the network security features of the present disclosure. From a high level, general description of the device, security appliance 100 includes a network port, Ethernet port 160, enabling direct physical connection to a gateway (network access device 205, FIG. 2). Security appliance also includes at least one storage module, e.g., memory 110 or storage 120, having stored thereon firmware 112 for operating the security appliance 100. Additionally, security appliance 100 includes a processor 105 that executes the program code of the firmware 112, which configures the appliance to perform several functional processes or operations, presented as method 600 in the flow chart of FIG. 6, which is later described. To support the overall functioning of security appliance 100, security appliance 100 includes additional hardware and software components located within an external casing 150, which may be a hard plastic or other rigid and durable material, in one embodiment. Within casing 150 is a circuit board 102 on which several of the physical components are wired. As shown, processor 105 is connected via a system interconnect 107 to each of memory 110, storage 120, WiFi transmitter/receiver 140, and Ethernet port 160. Memory 110 includes therein firmware 112, which can include a basic input output system (BIOS), in some embodiments. Firmware 112 also includes total network information shield (TNIS) utility 116, and user interface (UI) 118.

The nomenclature utilized to describe the firmware is not intended to be limiting on the disclosure, but instead to suggest a specific functional utility that provides a localized network protection of information and communication being transmitted across the network and into and out of the network. It is to be appreciated that the features described herein are not limited to a home network, although specific embodiments described herein can reference application to a home network of a user.

Example storage 120 includes a plurality of data modules, including appliance ID 122, which is a unique identifier of the security appliance 100, organization ID 123, which identifies the enterprise or business entity the user of the network works with/for and/or is affiliated with, and connected devices ID 124. Connected devices ID 124 is a list of all devices connected within the local network. The list is generated by security appliance 100 and updated as devices drop off and/or connect to the network. Storage 120 also includes additional software and/or data modules, including known threat signatures 125, raw network collected data 126, and packaged (organized) network collected data 128. Known threat signatures 125 is a collection of signatures downloaded from the security server (250, FIG. 2) and/or determined locally by the security appliance 100. Raw network collected data (NCD) 126 represent the unfiltered data that is collected by security appliance 100 as the appliance monitors the network traffic. Packaged NCD 128 represents the resulting data after the raw data is filtered to remove personal information or other user-identifying characteristics and arranged in a format that is usable at the security server, without requiring further modification.

Appliance 100 includes at least one Ethernet port, specifically Ethernet port 140, which is utilized to connect appliance 100 to network gateway. In the illustrated embodiment, appliance 100 also includes additional Ethernet ports 142 and 144, which can be utilized for wired connectivity to other network devices and/or user devices, particularly when appliance 100 is programmed to also operate/function as a wired gateway. Ethernet port 140 is shown having the modular connector (e.g., an RJ45) of an Ethernet cable 165 inserted therein and extending away from security appliance 100. As shown in FIG. 2, this opposing end connector of the cable 165 is inserted into a corresponding Ethernet port of the network access device (205). Illustrated above Ethernet port 140 are two status light emitting diodes (LEDs), which can be utilized to provide a current operational status of security appliance 100. Other functions can be assigned to the Status LEDs 155 in other embodiments. For example, one or both of status LEDs 155 can be assigned to indicate when a security breach or threat condition is active. No specific limitation is provided on the use of status LEDs 155.

Security appliance 100 also includes a power system, utilized to power the various electronic components operational within security appliance 100. As shown, security appliance 100 includes a power distribution component 130 for providing power to the various electronics within security appliance 100. Power distribution component 130 receives external power via power input jack 132 within which is inserted a first head of a power cable that connects to a power converter 134. Power converter 134 is connected to AC power cable and converts the received AC power into DC power utilized by security appliance 100. In one embodiment, security appliance 100 can be powered by a rechargeable battery. In another embodiment, security appliance 100 can be powered over the Ethernet cable, where the network access device provides power over Ethernet. The different powering mechanisms described herein are not necessarily exclusive of each other.

Figure 2:
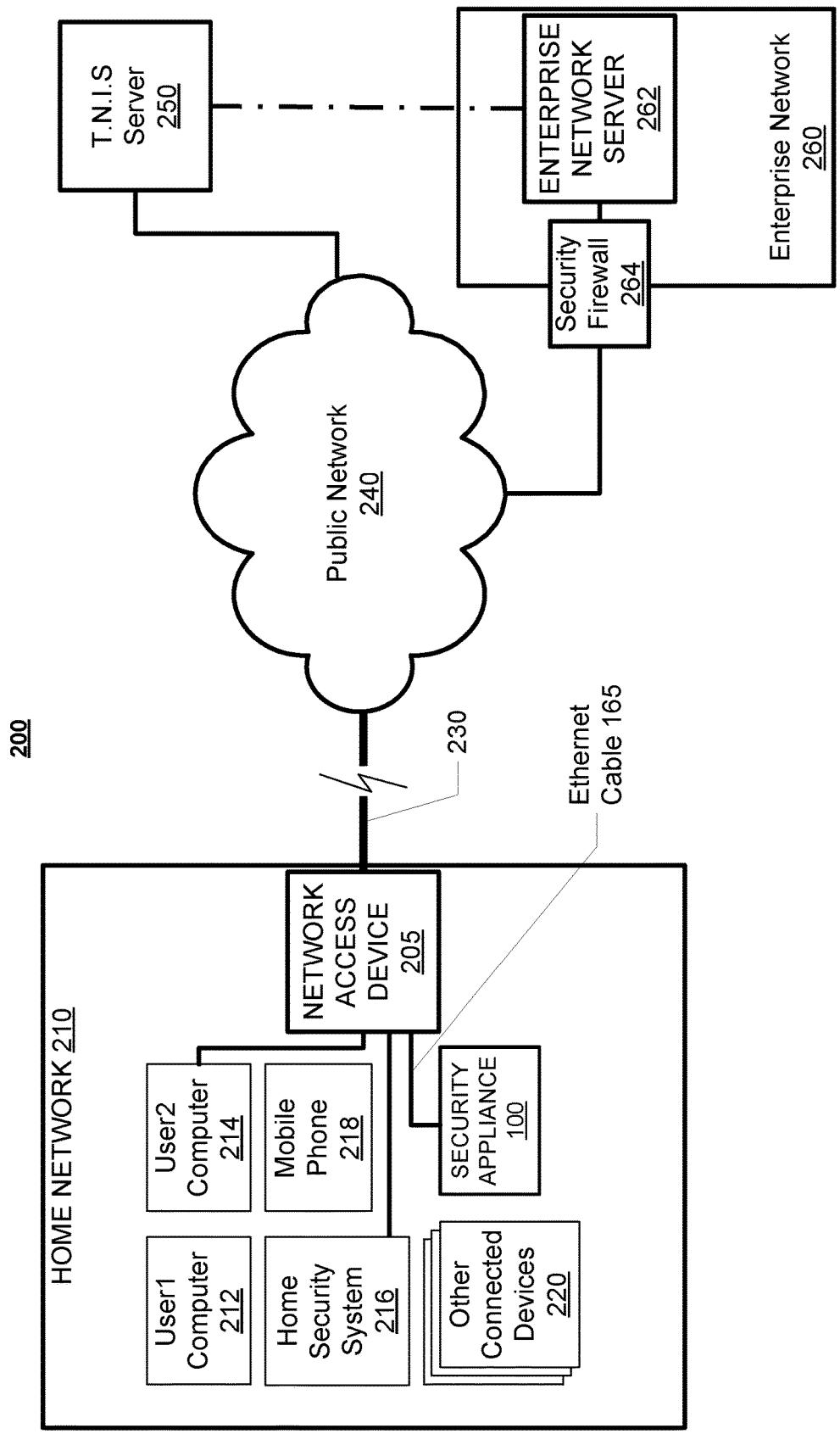
FIG. 2 depicts an example network security system, including at least one example security appliances connected across a public network to a remote management security server, according to one or more embodiments.
Figure 3:
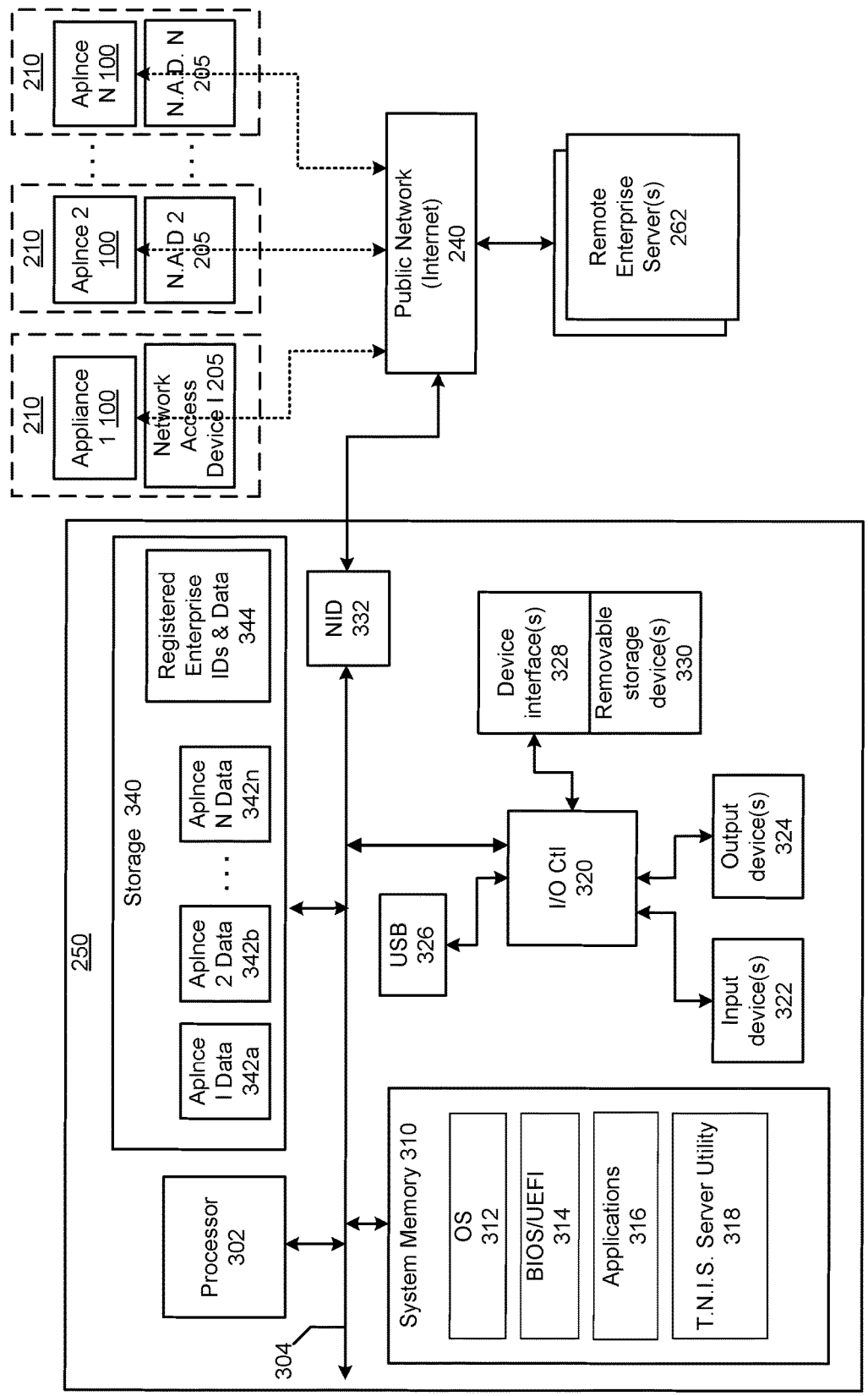
FIG. 3 is a block diagram representation of hardware and software components and network connectivity for an example security server that is utilized within the network security system of FIG. 2, according to one or more embodiments.

Referring now to FIG. 2, there is illustrated an overall system diagram of the dual network system 200 within which security appliance 100 operates. As utilized herein the term dual network refers to the presence of both the user's local (or home) network and the public network to which the network access device and security server connect. Example dual network system 200 includes example home network 210, which is connected via network access device 205 to an external public network 240 via one or more network connectivity medium 230. It is appreciated that the connection to public network 240 can be or can include one or more of a wired connection, a wireless connection, and a combination of wired and wireless. As provided herein, a wired connection can include a fiber, coax, or other signal/data transmission medium. Public network 240 can be a single wide area network, such as the Internet, or can be or can include a combination of different networks collectively forming a connection route between network access device and other devices connected across the public network. While not shown, the network access device 205 can connect to a service provider server, which in turn provides the connectivity to public network 240.

Network access device 205 provides access to a physical space, such as a house or apartment, within which a user can interface with a plurality of devices that each connect to the home network 210 in order to communicate with each other and/or to gain access to or communicate with external devices on public network 240. In this example, all access from within home network 210 to public network 240 is routed through network access device 205. Home network 210 includes user computer1 212 and user computer2 214. User computer1 212 can be a mobile computer or laptop, while user computer2 214 can be a desktop device. Both computers can also be the same type of device or a different type of computer device, such as a tablet. Home network 210 also includes home security system 216, which can include an alarm system and/or a security camera system. Mobile phone 218 can also be connected to home network 210, in the illustrative embodiment. Home network 210 can also include other connected devices 220, such as a door bell or dish television gateway. Notably, the manner of connection of these devices to home network 210 can be via wireless connectivity (i.e., where no direct line is show connecting back to network access device 205, as with user computer1 212 and mobile phone 218) or via wired connection (indicated by the connecting lines between specific ones of the enumerated/illustrated devices and network access device 205.

Finally, within home network 210 and connected via wired connection (Ethernet cable 165) to network access device 205 is security appliance 100. Security appliance 100 establishes a direct interface to the network traffic such that all incoming and outgoing traffic passes through security appliance and is filtered to block and remove threats and certain other signals, as described herein. Network traffic data is also accumulated and stored as raw network collected data 126 that is then filtered and formatted to generate usable data in packaged network collected data 128.

Figure 4:
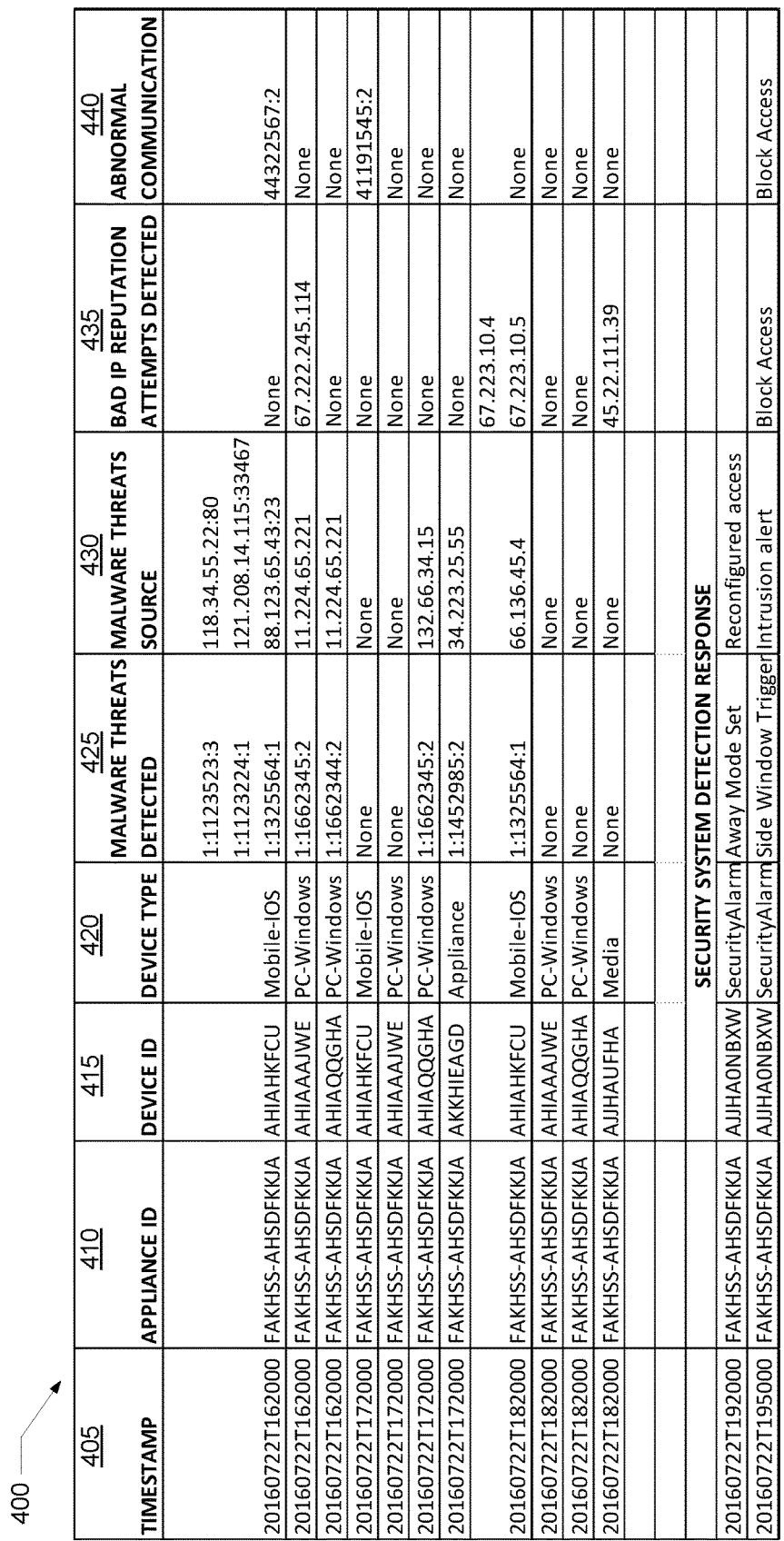
FIG. 4 illustrates a data table presenting example list of data that can be tabulated by the security appliance during device discovery and tracking within a home network environment, in accordance with one embodiment.

FIG. 4 illustrates an example data structure in the form of a table that includes packaged network collected data 128 arranged based on the identifiers of the various connected devices. As illustrated, table 400 includes columns of captured/generated data including, without limitation, the following columns: timestamp 405, appliance ID 410, device ID 415, device type 420, malware threats detected 425, malware threats source 430, bad IP reputation attempts detected 435, and abnormal communication 440. Table provides a histogram of sorts that shows specific types of items detected by security appliance 100 (identified by appliance ID 410) within the incoming and outgoing network traffic. As provided by the last depicted entries, the tracked devices can include a security alarm and the associated activity can include alarm setting and alarm triggering events, when the security appliance 100 is communicatively coupled to one or more security systems at the location. The presented list is not intended to be limiting on the disclosure, as the features described herein are applicable to a host of other devices and device types that can be communicatively connected to the local network.

Returning to FIG. 2, as provided in the illustrative embodiment, enterprise network 260 can also be connected to public network 240. As shown, enterprise network 260 includes at least one enterprise network server 262, which is protected from malicious traffic on public network 240 by security firewall 264. In a traditional setup, without security appliance 100, a user of a device, such as user computer1 212, can access their enterprise via a VPN establishing a tunnel from home network 210 to enterprise network 260 through public network 240. While this connection may appear to be safe, there is no protection provided within home network 210 against malware and other malicious threats that can attach to user computer1 212 when user computer1 is being used generally within home network 210 to access public network 240 without the VPN. The contaminated user computer 1 212 can then easily be used as a conduit to infiltrate the security firewall 264 of enterprise network 260. With the illustrated embodiment, security appliance 100 operates to block these malware and other threat signatures from operating within the home network 210, thus protecting user computer 1 212, and by extension enterprise network 260.

One application of the concepts described herein involves providing corporate enterprise security protection of remote employee home networks. The end goal would be to provide protections that are on level with the protections that would be afforded to employees on premise, but doing so in a manner that maintains the remote employee's privacy interests. The enterprises mentioned herein can be corporate/government enterprises with remote employees, as well as small businesses that want a cost-effective substitute for enterprise security protection. Additionally, the features described herein can also be utilized by end consumers who want a greater degree of security protection than what is currently available in consumer-grade network security products.

Referring briefly again to FIG. 2, connected to public network 240 is TNIS server 250, which provides the centralized point of data collection from a plurality of security appliances connected via public network 240. FIG. 3 provides an example TNIS server 250 having connection to and operating as a centralized collection point for data received from a plurality of security appliances via the public network 240. FIG. 3 is described with ongoing reference to components presented within FIGS. 1 and 2. TNIS sever 250 can be a plurality of distributed servers located at different geographic locations across the public network 240. TNIS server 250 can be configured similar to a standard server data processing system. As shown, TNIS server 250 includes one or more processor(s) 302 coupled to system memory 310 via system interconnect 304. System interconnect 304 can be interchangeably referred to as a system bus, in one or more embodiments. As shown, system memory 310 can include therein a plurality of software and firmware modules, including operating system (O/S) 312. In addition, system memory 310 includes basic input/output system (BIOS)/UEFI 314, application(s) 316 and TNIS server utility 318. The various software and/or firmware modules have varying functionality when their corresponding program code is executed by processor(s) 302 or other processing devices within server 250.

Server 250 further includes one or more input/output (I/O) controllers 320 which support connection to and processing of signals from one or more connected input device(s) 322, such as a keyboard, mouse, touch screen, or microphone. I/O controllers 320 also support connection to and forwarding of output signals to one or more connected output device(s) 324, such as a monitor or display device or audio speaker(s). In addition, server 250 can include universal serial bus (USB) 326 which is coupled to I/O controller 320. Additionally, in one or more embodiments, one or more device interface(s) 328, such as an optical reader, a universal serial bus (USB), a card reader, Personal Computer Memory Card International Association (PCMCIA) port, and/or a high-definition multimedia interface (HDMI), can be associated with server 250. Device interface(s) 328 can be utilized to enable data to be read from or stored to corresponding removable storage device(s) 330, such as a compact disk (CD), digital video disk (DVD), flash drive, or flash memory card. In one or more embodiments, device interface(s) 328 can also provide an integration point for connecting other device(s) to server 250. In one implementation, server 250 can physically connect to remote devices using device interface(s) 328. In such implementation, device interface(s) 328 can further include general purpose I/O interfaces such as $I^2C$, SMBus, and peripheral component interconnect (PCI) buses.

Server 250 also includes a network interface device (NID) 332. NID 332 enables server 250 to communicate and/or interface with other devices, services, and components that are located external to server 250. These devices, services, and components can interface with server 250 via an external network, such as public network 240, using one or more communication protocols. In particular, in one implementation, server 250 uses NID 332 to connect to a plurality of security appliances 100 via public network 240.

Public network 240 can be a local area network, wide area network, personal area network, and the like, and the connection to and/or between public network 240 and server 250 can be wired or wireless or a combination thereof. For purposes of discussion, network 240 is indicated as a single collective component for simplicity. However, it is appreciated that network 240 can comprise one or more direct connections to other devices as well as a more complex set of interconnections as can exist within a wide area network, such as the Internet.

Public network 240 provides a communication path to remote enterprise server(s) 262. More importantly, public network 240 provides a connection to each of a plurality of security appliances 100 that access public network 240 via a respective network access device 205 within a corresponding home network 210 (represented by the dashed outline). Three home networks are represented in the figure, each having a separate appliance, indicates as Appliance 1, 2, and N. In this context, the letter N represents an integer number that correlates to the total number of appliances dispatched across the network. Each of the appliances 100 (i) are centrally managed by server 250 and (i) transmits filtered metrics/data 342 back to server 250. The filtered metrics/data 342 are shown saved within storage 340 of server. Storage 340 also includes a database of correlated/aggregated security data 342 for each registered enterprise 344. According to one aspect, server 250 receives and stores filtered metric/data transmitted by each appliance 100 and aggregates that data generally and also provides a correlated aggregation based on the metrics/data 342 received from an appliance that is linked to/associated with a user of a specific registered enterprise. The enterprise specific data is then associated with the stored enterprise ID. It is appreciated that while the data does not include any of the user's personal information or network usage habits, the collected data can be analyzed to identify correlations or patterns that can indicate potential weaknesses in the enterprise's overall security.

FIG. 5 illustrates an example data structure in the form of a table that includes aggregated metrics/data sorted based on the identifiers of the registered enterprises. While only two registered enterprises are presented within the example table 500, it is appreciated that the number of registered enterprises can be any number, without limitation. Example table 500 is utilized to illustrate metrics about the arrangement of malware threats and contact with blacklisted IP addresses. Table 500 includes columns of data, including the following columns without limitation: enterprise ID 505, appliance ID 510, timeframe 515, summation of all appliance threats detected 520, population statistics 525, enterprise statistics 530, rank-ordered threats by frequency and severity such as the most frequently encountered priority 1 threat identifier 535, geographical distribution of threats detected 540, and rank-ordered geographic locations of threats such as top location 545. Together, the column values provide an enterprise represented by enterprise ID 505 data in aggregate, derivative statistics about the data, and rank-ordered data pertinent to the appliances associated with the enterprise for a given timeframe. In addition, the column values provide an enterprise similar statistics for the population of all TNIS appliances for the purpose of statistical comparison. The columns of data presented are exemplary only and not intended to limit the use of other columns/data within the specific implementation of the security server.

Figure 6:
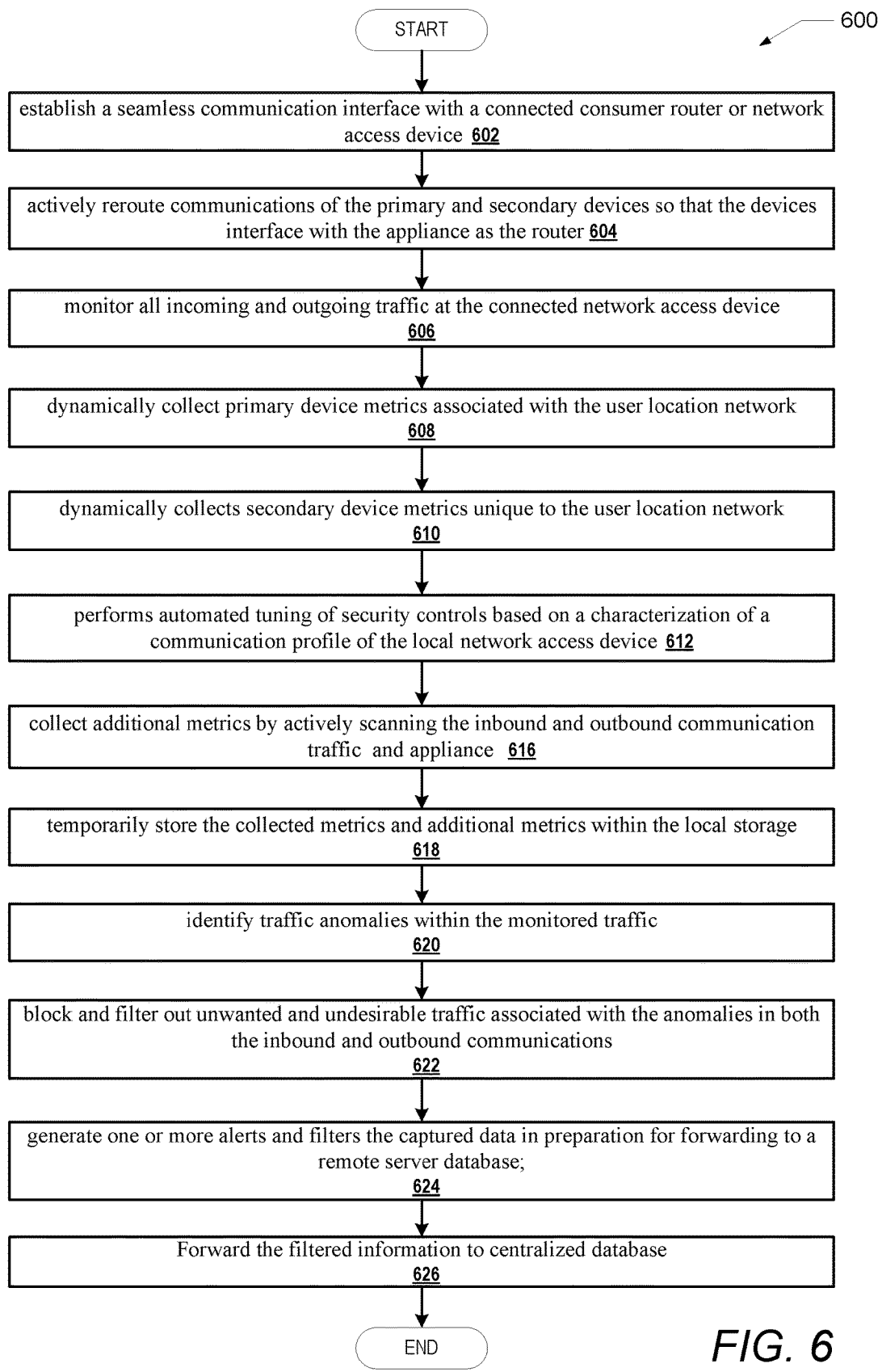
FIG. 6 provides a flow chart illustrating the method by which a security appliance of FIG. 1 generally operates to provide enhanced security of a home network and user devices connected thereto, in accordance with one or more embodiments.
Figure 7:
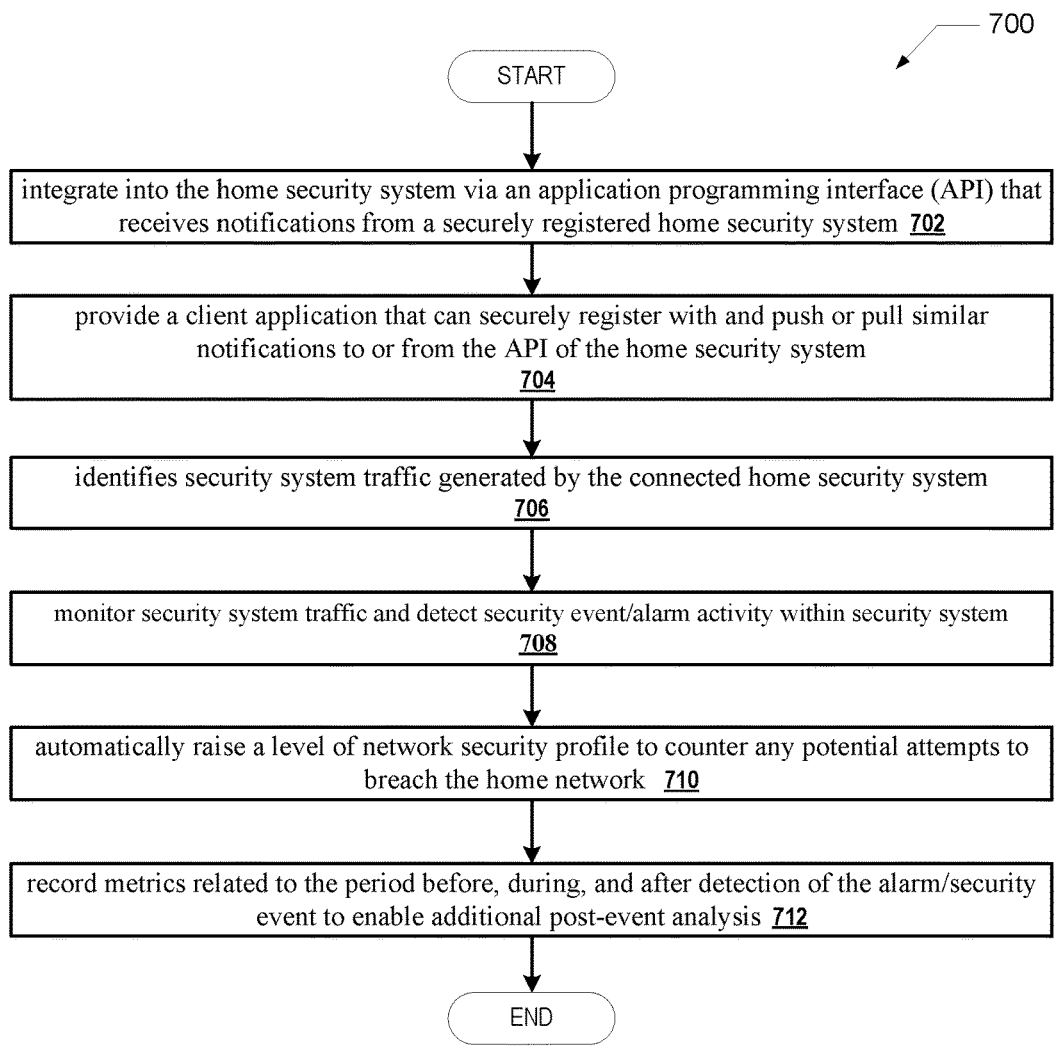
FIGS. 7 and 8 are flow charts illustrating different methods by which the security appliance integrates with the physical security system to provide enhanced building and network security, including during an away period, in accordance with one or more embodiments.
Figure 8:
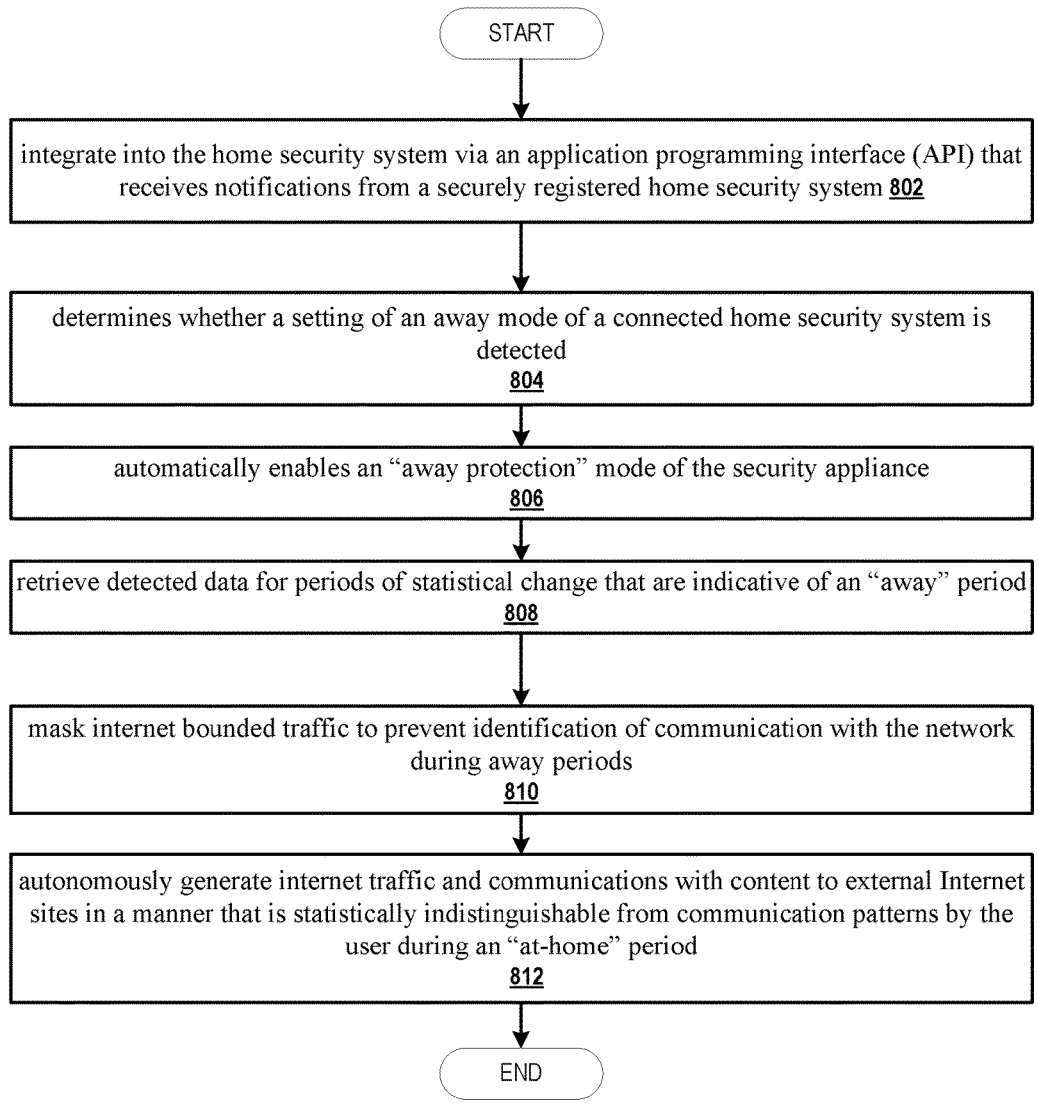

Referring now to the flow charts, and beginning with FIGS. 6, 7, and 8, there are illustrated various operations, processes, and sequence that collectively provide methods by which an example security appliance 100 operates to provide enhanced security of a user-location network, such as a home network. The methods 600, 700, and 800 represent processes and operations performed by execution, by processor 105, of program modules, codes, or instruction provided within firmware 112, utilizing data found within data storage 120 and/or retrieved from network-connected devices and pulled from detected network traffic. For simplicity, all processes are described as being performed generally by appliance 100. The following descriptions are made with reference to components and/or elements illustrated and described in the preceding figures, FIG. 1-5, without limitation. It is appreciated that certain aspects of the described methods may be implemented via other processing devices and/or execution of other code/firmware. Methods 600, 700, 800 are described as a sequence of blocks, in a particular order. It is appreciated that a different sequence or modification of certain portions of the described sequence can be implemented in alternate embodiments.

Method 600 begins at start block and proceeds to block 602, which provides security appliance 100 establishing a seamless communication interface with a connected gateway or network access device 205 that connects a home network 210 with a public network 240. As introduced above the network access device 205 can be connected to a service provider system/network that in turn provides the connection to/with the public network. Also, the seamless interface can be established via a wired connection utilizing an Ethernet cable. With the connection established, method proceeds to block 604 at which appliance 100 actively reroutes communications of the primary and secondary devices so that the devices interface with the appliance as the router, and appliance 100 monitors all incoming and outgoing traffic at the connected network access device (block 606). Based on the monitored traffic, appliance 100 dynamically collects primary device metrics associated with the user location network (block 608). The primary device metrics can include, without limitation, a number and type of attached computers, a type and patch level of the attached computers, types of communications made by the attached computers to each other and to the Internet. Appliance 100 also dynamically collects secondary device metrics unique to the user location network (block 610). The secondary device metrics can include, without limitation, profiles of home automation devices, gaming systems, security alarm systems, surveillance camera systems, multi-media systems, guest's mobile devices, the network access device and other installed local routers and network devices. At block 612, method provides that appliance performs automated tuning of security controls based on a characterization of a communication profile of the local network access device, where the characterization is completed via passive and active metric collection over a fixed period. In one embodiment, appliance 100 dynamically adjusts a policy of allowed communications for the device if a match for the device's profile is found within an expert system maintained at the server. The expert system is utilized to classify devices. The expert system is accessible to the appliance from within local storage (i.e., in embodiments where the database is pushed down to appliance by central management server 250), or through a remote query interface of the management server 250, or a combination of local storage and remote query interface access.

Once these metrics have been collected and stored, and the adjustments are completed, appliance 100 proceeds with implementing the core underlying security features (i.e., network traffic monitoring, threat detection and anomaly detection, privacy protection, malware blocking, etc.). Specifically, appliance 100 passively and actively collects additional metrics by passively monitoring communications and by actively scanning the communication traffic periodically for these additional metrics, in both inbound and outbound traffic (block 616). And appliance 100 temporarily stores the collected metrics and additional metrics within the local storage (block 618).

Appliance 100 identifies traffic anomalies within the monitored traffic (block 620). In response to identifying one or more of the traffic anomalies, appliance 100 blocks and filters out unwanted and undesirable traffic associated with the anomalies in both the inbound and outbound communications (block 622). Appliance 100 also initiates steps to report on and prevent further occurrence of the traffic anomalies. Specifically, appliance generates one or more alerts and filters the captured data in preparation for forwarding to a remote server database (block 624). Appliance 100 also forwards the filtered data/information about the identified traffic anomalies to a centralized database for evaluation and reporting (block 626). In one example embodiment, the forwarding process can include periodically packaging the collected metrics into a data package having a pre-determine protocol (e.g., a consistent format and sequencing of data across all appliances to enable readability of the data by server) and forward the data package to the centralized server for data analysis and reporting.

According to one aspect, the traffic anomalies can include, but are not limited to, occurrences of at least one of (i) measurable changes in traffic patterns, (ii) pre-identified traffic conditions, known threats, and potential threats. Measureable changes in traffic patterns can include but are not limited to temporal anomalies such as communication at an unusual time of the night when the device is normally inactive, quantitative anomalies such as an unusually large upload of data to a single location, or geospatial anomalies such as communications with an uncharacteristically high number of sites in a geographic region or unusual device-to-device communication with the local network. Pre-identified traffic conditions include but are not limited to reconnaissance types of activities such as network port scans within the local network, lateral movement types of activities such as remote connection attempts within the local network, and command and control types of activities such as heartbeat connections to the internet and remote shell communications. Some specific examples of these anomalies are presented in FIG. 5.

According to one embodiment, the firmware configures the appliance 100 to implement retrieval of privacy-preserving security metrics only, where the appliance 100 automatically screens out privacy data of all users within the user location network, such that only non-private data is retrieved and/or forwarded. This process can include limiting the monitored and collected metrics to only metrics associated with security needs for the network and user and, in some embodiments, the affiliated enterprise. With this embodiment, no network flow data or metadata about specific communications are collected.

As introduced above, the system utilizes a cloud-based server to collect metrics about the security configuration of the local network access device. Additionally, according to one embodiment, method can include configuring the security appliance to support automated patching by being small, special-purpose security patches that are pushed by a network-connected management server to minimize appliance downtime. In this embodiment, the security appliance 100 is centrally managed by the network-connected security management server (centralized server 250) and establishes and maintains persistent outbound connections to the management server (250).

Referring now to method 700 of FIG. 7, there is provided the sequence of security processes performed by appliance 100 when communicatively connected to and/or tied into the security systems of the home network. Method 700 begins at start block and proceed to block 702 at which appliance 100 integrates into the home security system via an application programming interface (API) that receives notifications from a securely registered home security system. Appliance 100 provides a client application that can securely register with and push or pull similar notifications to or from the API of the home security system (block 704). At block 706, appliance 100 identifies security system traffic generated by the connected home security system. Appliance 100 monitors the security system traffic signature for detection of an alarm or security event (block 708). The security system traffic can include one or more of traffic from an alarm system and traffic from security cameras, and other connected security devices. In response to detection (block 708) of an alarm activity within the security system traffic, appliance 100 automatically raises a level of network security profile to counter any potential attempts to breach the home network (block 710). It is appreciated that the automation of this process may include a time delay to allow the user to de-activate the alarm in situations where the alarm is a false alarm or an alarm system test. Appliance 100 also records metrics related to the period before, during, and after detection of the alarm/security event to enable additional post-event analysis thereof (block 712). Method 700 then ends.

Referring now to method 800 of FIG. 8, from start block, method 800 moves to block 802 at which appliance 100 integrates into the home security system via an application programming interface (API) that receives notifications from a securely registered home security system. At block 804, appliance determines whether a setting of an away mode of a connected home security system is detected. In response to detecting the setting of the away mode, appliance 100 automatically enables an "away protection" mode of the security appliance (block 806). With the away protection mode enabled, appliance 200 retrieves detected data for periods of statistical change that are indicative of an "away" period (block 808). Appliance 100 masks internet bounded traffic to prevent identification of communication with the network during away periods on the home network (block 810). Appliance 100 also autonomously generates internet traffic and communications with content to external Internet sites in a manner that is statistically indistinguishable from communication patterns by the user during an "at-home" period (block 812). According to one aspect, the firmware includes code that configures the appliance to enable manual configuration of an "away" mode selection to one of an enabled or disabled mode of operation. Method 800 then ends.

Figure 9:
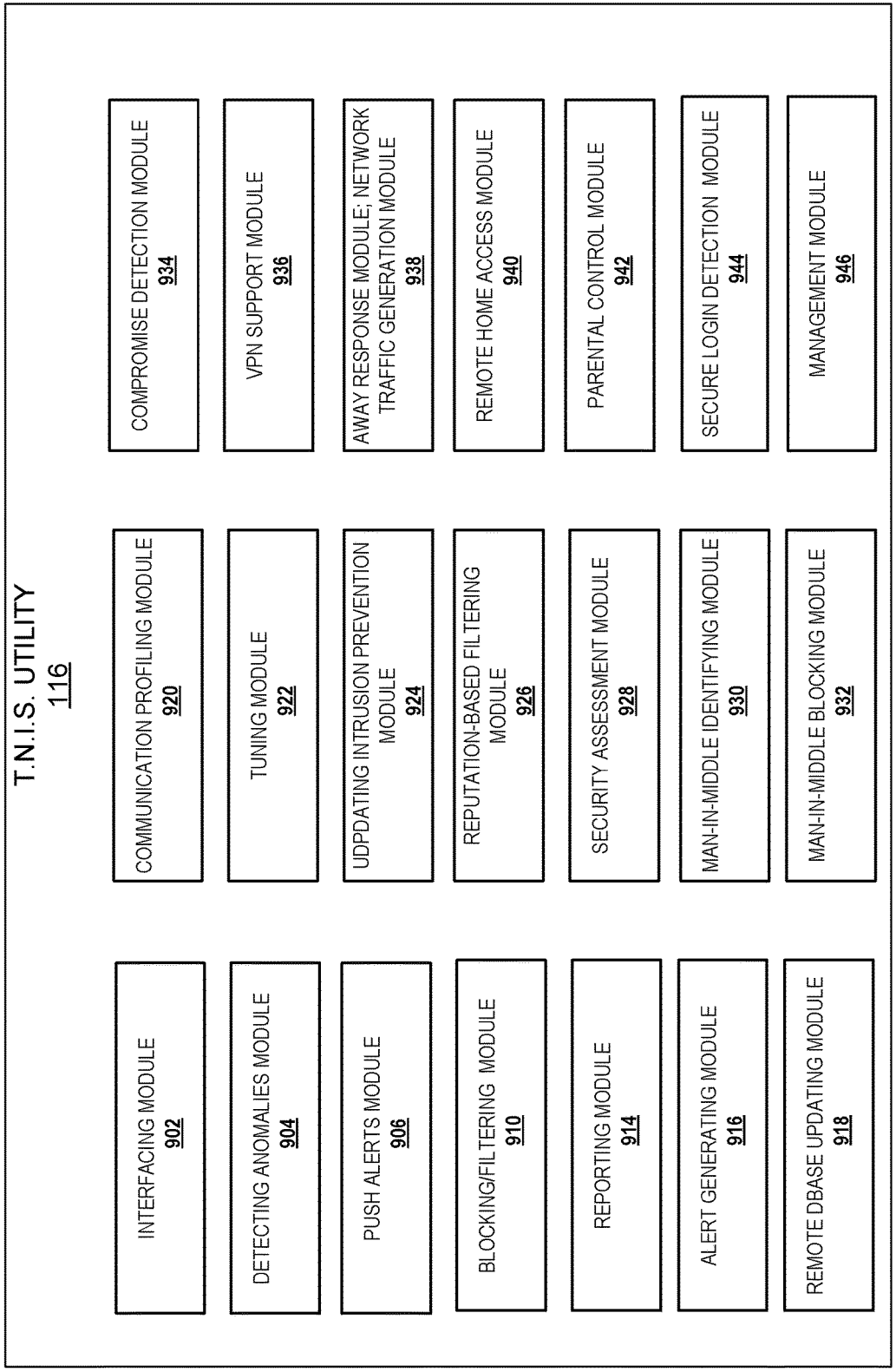
FIG. 9 is a block diagram representation of the various functional software modules provided within/by a total network information shield (TNIS) utility/firmware, according to a plurality of embodiments.

Referring now to FIG. 9, there is illustrated a block diagram representation of an example of a modular security appliance firmware, represented as TNIS utility 116. Each individual block represents a functional module within TNIS utility 116 that is associated with one or more firmware functions supported and/or provided by appliance 100. Each functional module represents a specific process or sets of processes that can be achieved or performed during operation of appliance 100. The modules within TNIS utility 116 enable the performance of one or more of the processes of device-implemented methods, including methods 600, 700, and 800. Additionally, included within the functional modules of expanded modular firmware, and specifically TNIS utility, are modules for: interfacing (block 902), via a security appliance, with a local user network access device that supports external/public network connectivity and information communication by one or more user devices; detecting (block 904) anomalies within a behavior associated with Internet usage through machine learning algorithms; and generating and forwarding configurable push alerts for security issues identified by the appliance, via push alert module (block 906). In addition, the processes include blocking/filtering out (block 910) unwanted and undesirable traffic associated with the anomalies in both inbound and outbound communications; and initiating (block 914) steps to report on and prevent further occurrence of the traffic anomalies, by generating (block 916) one or more alerts and updating (block 918) a remote server database.

The TNIS Utility 116 also includes modules for: profiling (block 920) communication across the network to automatically identify network endpoint; dynamically tuning (block 922) security controls based on the characterization of a device's communication profile; periodically updating (block 924) a network-wide intrusion prevention policy via accessing generally available threat intelligence; performing (block 926) reputation-based filtering of Internet communications based on that threat intelligence; performing (block 928) security assessments of a configuration of the router; identifying (block 930) and blocking (block 932) man-in-the-middle attacks on the network; and detecting (block 934) characteristics associated with the router having been compromised. The firmware processes also includes: enabling and supporting (block 936) a virtual private network (VPN) service to allow a user mobile device to tunnel back into an enterprise network and remotely access the enterprise network from inside the home. The firmware processes also includes: performing (block 938) network traffic generation to mask differences between at-home/away periods; and extending or configuring (block 940) remote access to the home network from outside the home with similar security features as the VPN channel and as with an in-home connection of the mobile device.

TNIS Utility 116 also includes functional blocks/modules for: providing (block 942) parental controls for Internet access schedules and content; detecting (block 944) secure login to the appliance; and in response to the secure login, opening (block 946) a management module that provides both automated firmware updates and a mobile application for end-user interaction with the Appliance. The management module provides a supporting cloud service for management and enterprise/mobile integration.

With the integration of the appliance 100 into the home network, the disclosure provides several additional functional benefits, including enterprise visibility into and measurement of the security of the remote employee's home network. This visibility is created by having an enterprise-provided Appliance physically attached to the network inside the employee's home. The Appliance collects metrics similar to those collected within a corporate enterprise, including the number and type of attached computers, the type and patch level of these computers, the types of communications made by these computers to each other and to the Internet, and so forth. According to one aspect, to collect these metrics for everything other than the router, the Appliance first actively inserts itself into their communications so that they believe that the Appliance is the router. The Appliance then collects certain metrics (a) passively by monitoring communications and (b) actively by periodically scanning the communications. The Appliance actively scans the home router periodically in both inbound and outbound directions with the assistance of a cloud-based server to collect metrics about its security configuration.

Additionally, the integration of the appliance 100 also provides enterprise visibility into the remote employee's home network in a manner that does not violate consumer privacy. Since the home network of a remote employee is used by family members and guests that are not employees, the metrics collected and reported to the employer must be carefully selected so that they don't violate (a) the privacy laws of international economies, (b) the privacy expectations of the non-employee users of the home network, and (c) the privacy expectations of the employee during periods of non-work. Instead of trying to distinguish between employee and non-employee devices or between periods of employee work and non-work, all metrics are limited to those that support the privacy needs listed previously. This privacy limitation rules out reporting metrics such as "netflow" data (metadata about every communication made by a monitored device) that would indiscriminately disclose all communication patterns.

Another benefit of the use of the disclosed appliance is the automated tuning of security controls based on the characterization of a home network device's communication profile. Once the Appliance has characterized a device through passive and active metric collection over a fixed period, the Appliance adjusts the policy of allowed communications for that device if the appliance finds a match for the device's profile in the appliance's intelligence database. In one embodiment, the intelligence database is populated over time by a security analyst that assesses metrics collected for a device and defines restrictions for that device's communications to mitigate identified security issues, if any. The intelligence database is accessible to the Appliances in either local storage (i.e., receive via a push by central management), through a remote query interface, or a combination of these.

Yet another benefit inherent in the use of the appliance 100 is the integration of a home network security device with a home security system. The benefit of this integration is a holistic view of the physical and logical security of a home. For example, a physical intruder could have installed a monitoring device (active or passive) on the home network or tampered with the employee's work computer. Similarly, an employee that enables the "away" mode of a home security system could also automatically enable the "away" mode of the home network security device. The Appliance enables this integration by providing an application programming interface (API) for receiving notifications from a securely registered home security system and by providing a client application that can securely register with and push similar notifications to the home security system's API. In one embodiment, the Appliance may also support a pull model for one or both sides of the integration.

As another benefit, the integration of the appliance allows for internet traffic generation to mask differences between "at-home" and "away" periods on a home network. This feature augments the physical security of the home by denying an indicator to would-be intruders. The Appliance accomplishes this by first collecting metrics about usage when home devices are actively communicating over a learning period of a fixed number of days. Once the patterns have been learned, the Appliance detects periods of statistical change that would indicate an "away" period and generates communications with random content to Internet sites in a manner that is statistically indistinguishable from communication patterns during an "at-home" period. In one embodiment, the Appliance also supports a manual configuration to enable/disable the "away" mode of operation.

As one additional benefit, the disclosure provides for centralized management of security appliances on a home network. Thus, unlike conventional consumer-grade network security devices, which all require the consumer to configure and maintain the device, the current disclosure eliminates the need for these error-prone processes by providing a centralized server management of the appliances. According to one embodiment, maintenance can also be dependent on the availability of security patches from the product's vendor. By centrally managing the Appliance through security patch application, log collection and analysis, and product upgrades, customers get enterprise-grade benefits without needing the expertise to do so or ceding such control to their employer. The Appliance enables centralized management by persistent outbound connections to a cloud-based management server, thus avoiding opening an inbound firewall port in the router that could be attacked. The Appliance supports automated patching by structuring its firmware so that small, special-purpose security patches can be pushed by the cloud-based management server to minimize Appliance downtime. The centralized management is provided via security management server 250, which provides the method process illustrated by FIG. 10.

Figure 10:
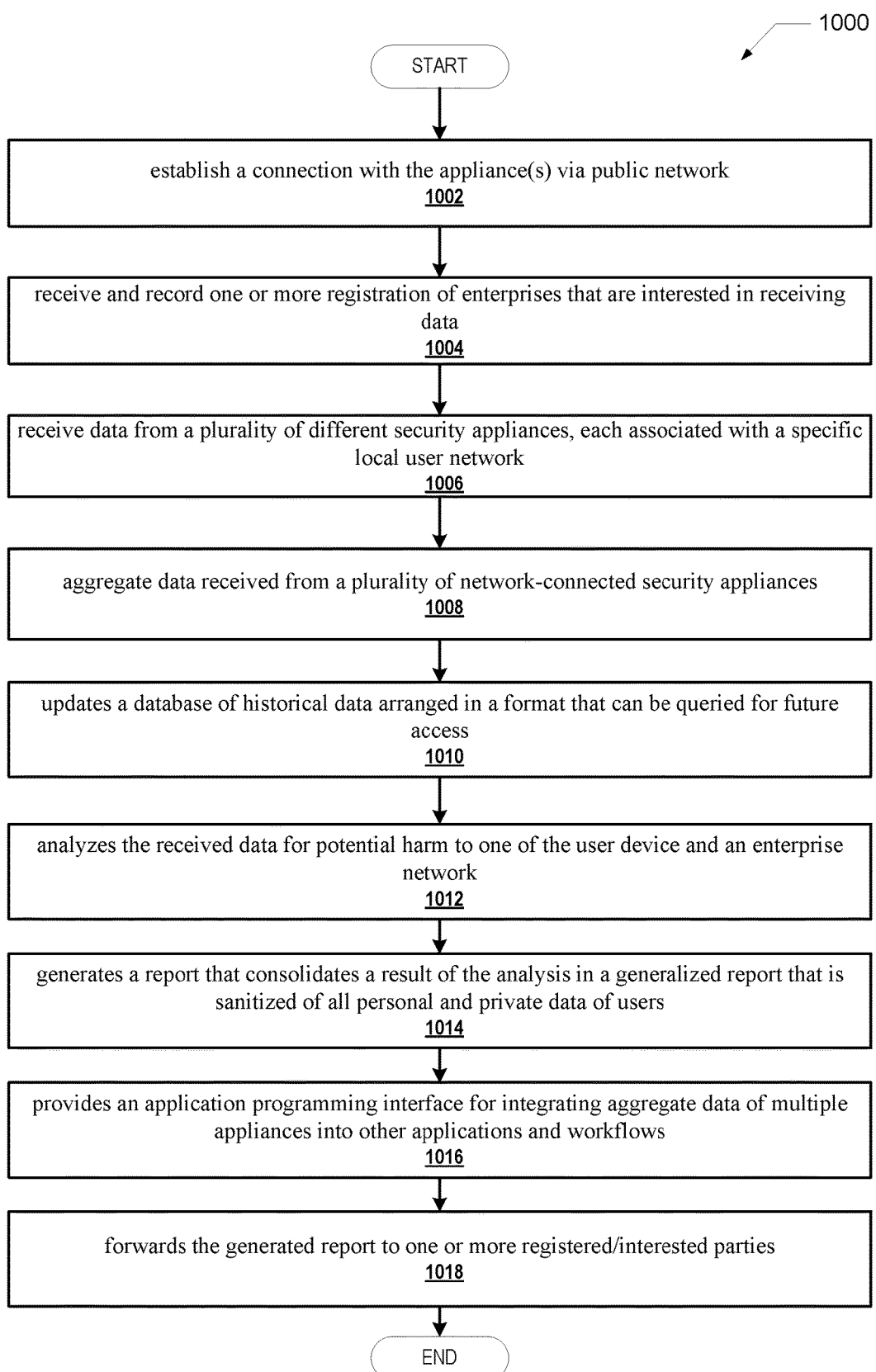
FIG. 10 provides a flow chart illustrating the method by which a security server processes data received from connected security appliances to generally reports and improve network security, in accordance with one or more embodiments.

FIG. 10 is a flow chart illustrating a method by which the security management server 250 interfaces with the appliance 100 to extend the ability of appliance 100 to provide enhanced device and network security, and by extension enterprise network security, in accordance with one or more embodiments. Server 250 is a part of a system that enhances at-home security of network connected devices, where the system includes at least one and potentially a large number of distributed security appliances. As previously described, management server 250 is communicatively connected to the security appliance 100 via the public network. The functional processes of method 1000 are provided by server processor executing of modules/code within server firmware. The processor is also communicatively connected to a secured centralized database within which received data from the connected appliances are stored. For simplicity, the method processes are described as being generally performed by server 250.

Method 1000 begins at start block and proceeds to block 1002, at which server 250 establishes a connection with the appliance(s) via public network, utilizing pre-programmed communication protocols and device IDs and internet protocol (IP) addresses, etc. According to one aspect, each appliance establishes and maintains persistent outbound connections to the centralized, network-connected security management server. At block 1004 server also receives and records one or more registration(s) of enterprises that are interested in receiving data that can be utilized to determine potential risks from remote login by users to the enterprise network and/or to improve network security (e.g., by updating their remote employee login policies), etc. Server 250 receives data from a plurality of different security appliances, each associated with a specific local user network to which a respective appliance is connected (block 1006). Server 250 aggregates data received from a plurality of network-connected security appliances (block 1008). Server 250 updates a database of historical data arranged in a format that can be queried for future access (block 1010). Server 250 then analyzes the received data for potential harm to one of the user device and an enterprise network to which the user device connects (block 1012). Server 250 generates a report that consolidates a result of the analysis in a generalized report that is sanitized of all personal and private data of users, including patterns of use and connection of the user device (block 1014). Server 250 provides an application programming interface for integrating aggregate data of multiple appliances into other applications and workflows for enterprises that need visibility into the network security of their remote workforce (block 1016). Where applicable, server 250 forwards the generated report to one or more registered/interested parties (e.g., the enterprise to which the user is associated) that have subscribed to receive the report (bock 1018). Method 1000 then ends.

Figure 11:
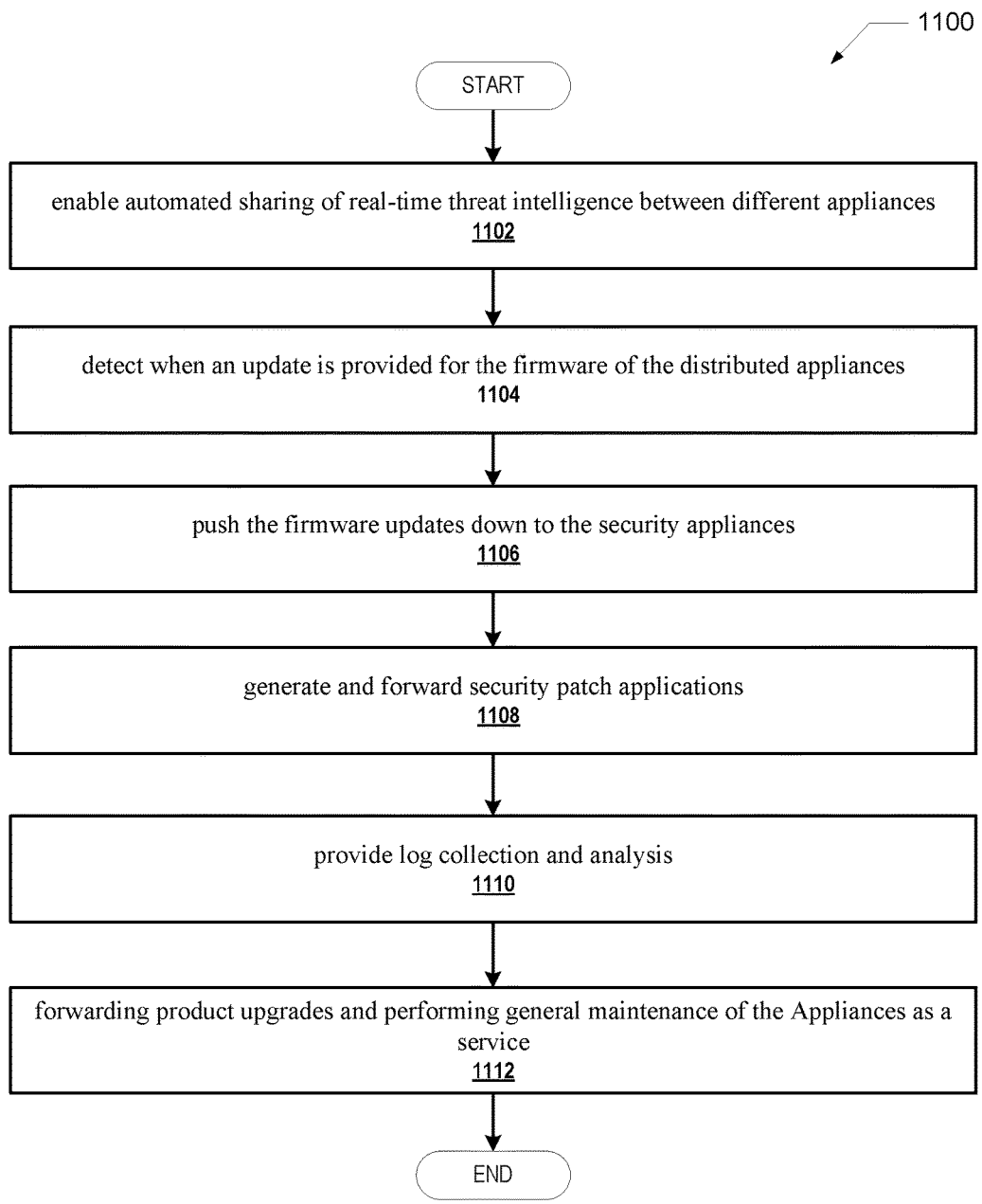
FIG. 11 is a flow chart illustrating a method by which the security server interfaces with and updates the firmware of the security appliances, in accordance with one or more embodiments.

FIG. 11 presents the method by which the centralized security management server provides firmware updates to security appliances. At block 1102, server 250 enables automated sharing of real-time threat intelligence between different appliances. Server 250 also detects when an update is provided for the firmware of the distributed appliances (block 1104), and server 250 pushes the firmware updates down to the security appliances 110 (block 1106). In one embodiment, the updates may be based on an analysis of the aggregated data and specific updated may be directed to specific ones of the one or more appliances based on activities occurring at those specific appliances. Accordingly, the server 250 provides centralized management of the appliance by generating and forwarding security patch applications (block 1108), providing log collection and analysis (block 1110), and forwarding product upgrades and performing general maintenance of the Appliances as a service (block 1112). Method 1100 then ends.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A security appliance comprising:
   a network port enabling direct connection to a gateway;
   a storage module having stored thereon firmware for operating the security appliance; and
   a processor that executes the program code of the firmware, which configures the security appliance to:
   establish a seamless communication interface with a connected gateway;
   in response to establishing the seamless communication interface, monitor traffic coming into and going out from the connected gateway;
   identify traffic anomalies within the monitored traffic; and
   in response to identifying one or more of the traffic anomalies:
      block and filter out unwanted and undesirable traffic associated with the traffic anomalies; and
      initiate steps to report on and prevent further occurrence of the traffic anomalies, by generating one or more alerts and filtering out the captured data in preparation for forwarding to a remote server database; and forward the filtered information about the identified traffic anomalies to a centralized database for evaluation and reporting;

enable manual configuration of an "away" mode selection to one of an enabled mode or disabled mode of operation; and mask internet bounded traffic by configuring the security appliance to:

detect periods of statistical change that are indicative of an "away" period; and in response to detecting periods of statistical change indicative of the away period, generate internet traffic and communications with random content to Internet sites in a manner that is statistically indistinguishable from communication patterns during an "at-home" period.

2. The security appliance of claim 1, wherein the traffic anomalies comprise at least one of measurable changes in traffic patterns, pre-specified traffic conditions, known threats, and potential threats.

3. The security appliance of claim 1, wherein the firmware further configures the appliance to:

dynamically collect primary device metrics associated with a user location network, the metrics comprising a number and type of attached computers, a type and patch level of the attached computers, and types of communications made by the attached computers to each other and to the Internet;

dynamically collect secondary device metrics unique to the user location network, the secondary device metrics comprising profiles of home automation devices, gaming systems, security alarm systems, surveillance camera systems, multi-media systems, guest's mobile devices, the network access device and other installed local routers and network devices.

4. The security appliance of claim 3, further comprising the firmware configuring the security appliance to:

actively reroute communications of a primary and a secondary device so that the primary and secondary devices interface with the security appliance as a router;

passively collect metrics by monitoring communications;

actively scan the communications periodically for additional metrics; and temporarily store the collected and additional metrics within the local storage.

5. The security appliance of claim 4, further comprising: periodically package the collected metrics into a data package having a pre-determine protocol; and forward the data package to a server for data analysis and reporting.

6. The security appliance of claim 1, further comprising the firmware configuring the security appliance to:

actively scan a router periodically in both inbound and outbound directions, utilizing a cloud-based server to collect metrics about the security configuration of the router.

7. The security appliance of claim 1, wherein the firmware configures the security appliance to support automated patching by being configured to enable small, special-purpose security patches to be pushed by a network-connected management server to minimize security appliance downtime, wherein the security appliance is centrally managed by a network-connected security management server and establishes and maintains persistent outbound connections to the management server.

8. The security appliance of claim 1, wherein the firmware further configures the appliance to:

perform automated tuning of security controls based on a characterization of a communication profile of the local network device, wherein the characterization is completed via passive and active metric collection over a fixed period; and dynamically adjust a policy of allowed communications for the device if a match for the device's profile is found within an intelligence database maintained at the server.

9. The security appliance of claim 1, wherein the firmware further configures the security appliance to:

detect a setting of an away mode of a home security system that is network connected; and in response to detecting the setting of the away mode, automatically enable an "away protection" mode of the security appliance;

wherein the firmware enables integration of the home security system via an application programming interface (API) that receives notifications from a securely registered home security system and by providing a client application that can securely register with the API of the home security system to push similar notifications to or pull similar notifications from the API.

10. The security appliance of claim 9, wherein the firmware further configures the appliance to:

mask internet bounded traffic to prevent identification of communication with the network during away periods on the home network.

11. The security appliance of claim 1, wherein the firmware further configures the appliance to mask the internet bounded traffic by configuring the appliance to:

collect metrics about usage and traffic when home devices are actively communicating over a learning period;

learn patterns based of the collected metrics to generate a home network communication profile; and automatically tune one or more security rules for enforcement by the security appliance based on the generated home network communication profile;

wherein the metrics are collected in a format that enables packaging and forwarding to a remote security server.

12. The security appliance of claim 1, wherein the firmware further configures the appliance to:

identify security system traffic generated by one or more connected home security systems; and in response to detection of an alarm activity within the security system traffic:

automatically raise a level of network security profile to counter any potential attempts to breach the home network; and record metrics related to the period before, during and after detection of the alarm activity to enable additional post-event analysis of the event;

wherein security system traffic comprises one or more of traffic from an alarm system and traffic from security cameras.

13. The security appliance of claim 1, wherein the firmware configures the appliance to implement retrieval of privacy-preserving security metrics, wherein the appliance screens out privacy data of all users within the user location network, such that only non-private data is forwarded by limiting monitored and collected metrics to only metrics associated with security needs for the network, user, and enterprise, wherein no network flow data or metadata about specific communications are collected.

14. A system that enhances at-home security of network connected devices, the system comprising:

a security appliance having:

a network port enabling direct connection to a gateway/
gateway, wherein the security appliance is a plug-
and-play network security appliance;
a storage module having stored thereon firmware for
operating the security appliance; and
a processor that executes the program code of the
firmware, which configures the security appliance to:
establish a seamless communication interface with a
connected gateway;
in response to establishing the seamless communication interface, monitor traffic coming into and going
out from the connected gateway;
identify anomalies within the monitored traffic; and
in response to identifying one or more of the anomalies:
block and filter out unwanted and undesirable traffic
associated with the anomalies in both inbound and
outbound communications without requiring
assistance of/from a centralized database for
evaluation and response; and
initiate steps to report on and prevent further occurrence of the anomalies, by generating one or more
alerts and updating a remote server database;
enable manual configuration of an "away" mode selection to one of an enabled mode or disabled mode of
operation; and
mask internet bounded traffic by configuring the security appliance to:
detect periods of statistical change that are indicative
of an "away" period; and
in response to detecting periods of statistical change indicative of the away period, generate internet traffic and communications with random content to Internet sites in a manner that is statistically indistinguishable from communication patterns during an "at-home" period.

15. The system of claim 14, further comprising:
a management server communicatively connected to the
security appliance via the network, the server having a
server processor communicatively coupled to the
secured centralized database and server firmware that
executes on the processor to cause the server to:
receive data from a plurality of different security appliances, each associated with a specific local user
network to which a respective appliance is connected;
analyze the received data for potential harm to one of
the user device and an enterprise network to which
the user device connects;
generate a report that consolidates a result of analyzing
the received data in a generalized report sanitized of
all personal and private data of users, including
patterns of use and connection, of the device; and
forward the generated report to one or more interested
parties subscribed to receive the report.

16. The system of claim 14, wherein the server firmware
further causes the server processor to:
aggregate data received from a plurality of network-connected security appliances;
update a database of historical data arranged in a format
that can be queried for future access;
enable automated sharing of real-time threat intelligence
between different network-connected security appliances;
update firmware for one or more of the plurality of
network-connected security appliances based on an
analysis of the aggregated data; and
provide an application programming interface for integrating aggregate data of multiple network-connected
security appliances into other applications and workflows for enterprises that need visibility into the network security of their remote workforce;
wherein the one or more of the plurality of network-connected security appliances is centrally managed by
a network-connected security management server and
establishes and maintains persistent outbound connections to the management server; and
wherein the server provides centralized management of
the one or more of the plurality of network-connected
security appliances by generating and forwarding security patch applications, providing log collection and
analysis, and forwarding product upgrades and general
maintenance of the one or more of the plurality of
network-connected security appliances as a service.

17. A device-implemented method comprising:
interfacing, via a security appliance, with a local user
network device that supports external/public network
connectivity and information communication by one or
more user devices;
detecting anomalies within a behavior associated with
Internet usage through machine learning algorithms;
and
generating and forwarding configurable push alerts for
security issues identified by the security appliance;
blocking and filtering out unwanted and undesirable traffic associated with the anomalies in both inbound and
outbound communications;
initiating steps to report on and prevent further occurrence
of the anomalies, by generating one or more alerts and
updating a remote server database;
enabling manual configuration of an "away" mode selection to one of an enabled mode or disabled mode of
operation; and
masking internet bounded traffic by configuring the security appliance to:
detect periods of statistical change that are indicative of
an "away" period; and
in response to detecting periods of statistical change
indicative of the away period, generate internet traffic and communications with random content to
Internet sites in a manner that is statistically indistinguishable from communication patterns during an
"at-home " period; and
implementing retrieval of privacy-preserving security
metrics, wherein the security appliance screens out
privacy data of all users within the user location
network, such that only non-private data is forwarded
by limiting monitored and collected metrics to only
metrics associated with security needs for the network,
user, and enterprise, wherein no network flow data or
metadata about specific communications are collected.

18. The method of claim 17, further comprising:
profiling communication across the network to automatically identify network endpoint;
dynamically tuning security controls based on the characterization of a device's communication profile;
periodically updating a network-wide intrusion prevention policy via accessing generally available threat
intelligence;
performing reputation-based filtering of Internet communications based on that threat intelligence;
performing security assessments of a configuration of a
router;
identifying and blocking man-in-the-middle attacks on
the network; and detecting characteristics associated with the router having been compromised.

19. The method of claim 17, further comprising:

enabling and supporting a virtual private network (VPN) channel to allow a user mobile device to tunnel back into the home network from outside the home;

performing network traffic generation to mask differences between at-home/away periods; and extending similar security features to the VPN channel as with an in-home connection of the mobile device.

20. The method of claim 17, further comprising:

providing parental controls for Internet access schedules and content;

detecting secure login to the security appliance; and in response to the secure login, opening a set-up of a mobile application for end-user interaction with the security appliance, which provides a supporting cloud service for management and enterprise/mobile integration.

\* \* \* \* \*